(12) United States Patent
Liang et al.

(10) Patent No.: US 7,516,935 B2
(45) Date of Patent: *Apr. 14, 2009

(54) STAND FOR RETAINING COMPUTER CHASSIS

(75) Inventors: Chun-Chi Liang, Tu-Cheng (TW);
Pin-Shian Wu, Tu-Cheng (TW); Ji-Guo Xu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 12 days.

This patent is subject to a terminal disclaimer.

(21) Appl. No.: 11/395,610

(22) Filed: Mar. 31, 2006

(65) Prior Publication Data

US 2007/0001085 A1 Jan. 4, 2007

(30) Foreign Application Priority Data

Jun. 3, 2005 (CN) .................. 2005 2 0059571 U (51) Int. Cl.
*F16M 3/00* (2006.01)

(52) U.S. Cl. .................... 248/676; 248/146; 248/175; 248/346.03; 248/918

(58) Field of Classification Search ......... 248/676–678, 248/528, 150, 153, 154, 175, 176.3, 917, 248/292.12, 346.03, 918; 312/351.9, 223.2, 312/351.1, 351.4; 604/322; 403/92–97, 403/103, 108; 297/16.1, DIG. 11; 361/679, 361/683
See application file for complete search history.

(56) References Cited

U.S. PATENT DOCUMENTS

| | | | | |
|---|---|---|---|---|
| 2,222,089 | A * | 11/1940 | Saffell | 99/426 |
| 3,610,560 | A * | 10/1971 | Dillabough | 248/97 |
| 4,872,733 | A * | 10/1989 | Tedham et al. | 312/351.4 |
| 5,246,410 | A * | 9/1993 | Fun | 482/53 |
| 5,527,253 | A * | 6/1996 | Wilkinson et al. | 482/147 |
| 5,961,429 | A * | 10/1999 | Hsu | 482/142 |
| 5,982,885 | A * | 11/1999 | Ho | 379/446 |
| 6,311,941 | B1 | 11/2001 | Feldmeyer | |
| 6,364,278 | B1 | 4/2002 | Lin et al. | |
| 6,454,234 | B1 * | 9/2002 | Westbrook | 248/317 |
| 6,614,908 | B1 * | 9/2003 | Huang | 379/446 |
| 6,739,649 | B2 * | 5/2004 | Kelly et al. | 297/16.1 |
| 6,802,328 | B2 * | 10/2004 | Lin | 135/96 |
| 6,929,337 | B2 * | 8/2005 | Helot et al. | 312/223.2 |

* cited by examiner

*Primary Examiner*—Korie H. Chan (57) ABSTRACT

A stand for retaining a computer chassis includes a base frame, a pair of clamping arms, and a pair of pivoting members. Each of the pivoting members includes a linking portion connected to each of the clamping arms, and a pivoting portion pivotally connected to two ends of the base frame. The pivoting portion includes a device by which the clamping arms capable of being turned to a position and kept in the position.

18 Claims, 7 Drawing Sheets

STAND FOR RETAINING COMPUTER CHASSIS

CROSS-REFERENCE TO RELATED APPLICATION

Related subject matter is disclosed in a co-pending U.S. patent application Ser. No. 11/306,484, filed on Dec. 29, 2005, and having a same title with the present application, and another co-pending U.S. patent application Ser. No. 11/395,600 filed on the same date, Mar. 31, 2006, of this application and having a same title with the present application, which are assigned to the same assignee with this patent application.

BACKGROUND

1. Field of the Invention

The present invention relates to a stand, and particularly to a stand which can freely and stably support computer chassis with different sizes.

2. General Background

Conventional desktop computer enclosures are usually classified as tower computer enclosures and horizontal computer enclosures. Due to a compact size trend of the development of computer enclosures, horizontal computer enclosures are made much thinner than before. To enable a horizontal computer enclosure to stand like a tower computer enclosure, a supporting apparatus, such as a pedestal is needed.

A conventional stand is often secured to a bottom of a computer chassis via a plurality of screws. However, using extra tools to screw or unscrew the screws makes the assembly or disassembly process unduly cumbersome.

Another conventional stand such as disclosed in U.S. Pat. No. 6,364,278, includes two coupled supporting members. Each supporting member includes a dovetail shaped protrusion to couple with a recess of the other supporting member. This structure is simple and readily to be assembled. However, a clamping ledge is integrally formed from each supporting member. Therefore, the stand only engages a part of a lower portion of the computer chassis. When the computer chassis has a great height, the stand may not stably support the computer chassis.

What is desired, therefore, is a stand stably and freely supporting computer chassis with different sizes.

SUMMARY

In one preferred embodiment, a stand for retaining a computer chassis includes a base frame, a pair of clamping arms, and a pair of pivoting members. Each of the pivoting members includes a linking portion connected to each of the clamping arms, and a pivoting portion pivotally connected to two ends of the base frame. The pivoting portion includes a device by which the clamping arms capable of being turned to a position and kept in the position.

Other advantages and novel features will become more apparent from the following detailed description of preferred embodiments when taken in conjunction with the accompanying drawings, in which:

DETAILED DESCRIPTION OF THE EMBODIMENTS

Figure 1:
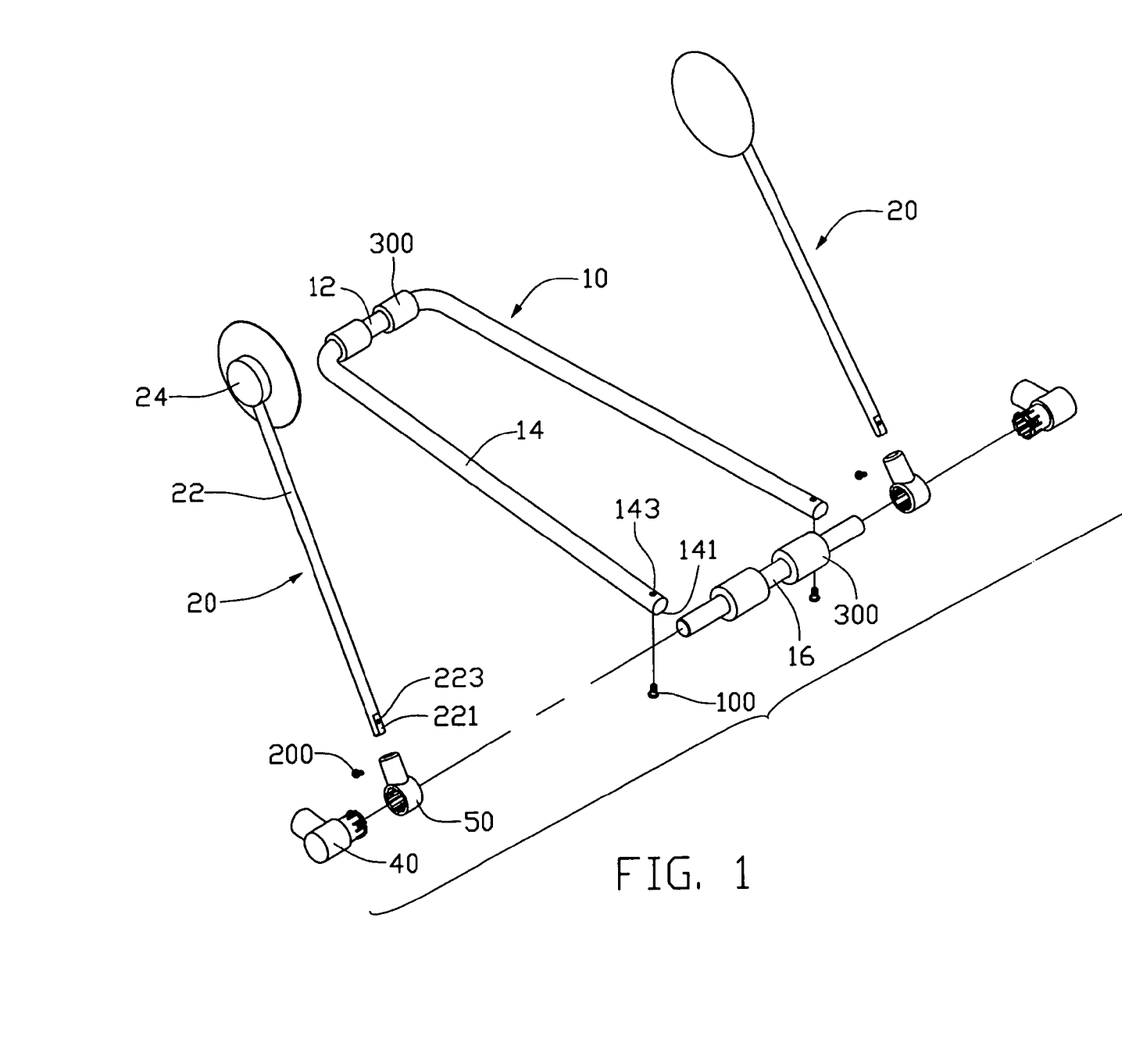
FIG. 1 is an exploded, isometric view of a stand in accordance with a preferred embodiment of the present invention, the stand including a connecting member and a pivoting member.
Figure 2:
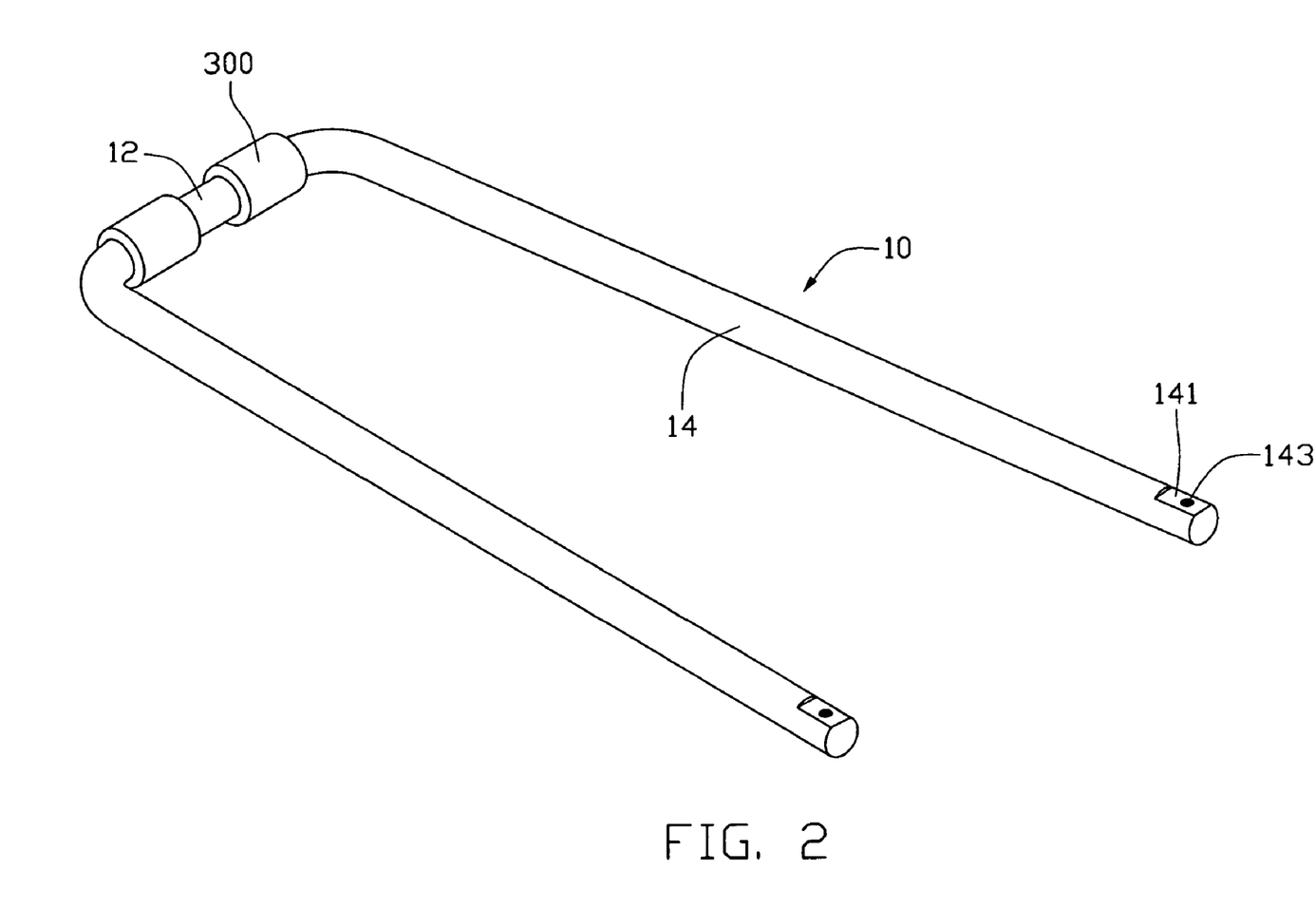
FIG. 2 is an isometric view of a base frame of the stand of FIG. 1.
Figure 8:
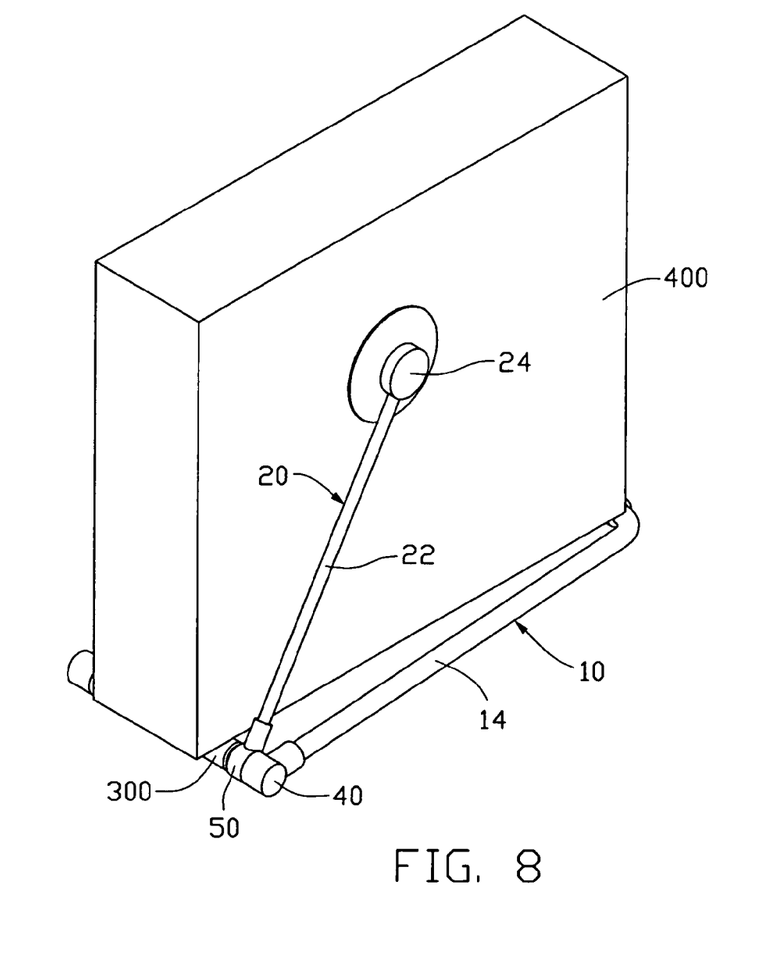
FIG. 8 is an assembled view of FIG. 1, together with a computer chassis.

Referring to FIGS. 1, 2, and 8, a stand in accordance with a preferred embodiment of the present invention supports an electronic device like a desktop having a computer chassis 400, and includes a base frame 10, a pair of clamping arms 20, a shaft 16, a pair of connecting members 40, and a pair of pivoting members 50. The connecting members 40 are connected with the pivoting members 50. The clamping arms 20 are pivotally connected to the base frame 10 via the shaft 16, the connecting members 40, and the pivoting members 50.

The base frame 10 has a U-shaped configuration. The base frame 10 includes a pair of levers 14, and a beam 12. The beam 12 is connected between the two levers 14. A cutout 141 is defined in a free end of each lever 14. A threaded hole 143 is defined in the cutout 141.

Each clamping arm 20 includes a pole 22, and a retaining pad 24 arranged at an end of the pole 22. The retaining pads 24 are for engaging sides of the computer chassis 400 and sandwich the computer chassis 400 therebetwen. In this preferred embodiment, the retaining pads 24 are circular rubber suckers. A cutout 221 is formed in the other end of each pole 22. A threaded hole 223 is defined in the end of each pole 22, which the cutout 221 is formed in.

A plurality of bushes 300 is separately fixed around the shaft 16 and the beam 12 of the base frame 10. The bushes 300 are made of rubber, for preventing a bottom of the computer chassis 400 being scraped and unwillingly moving on the stand.

Figure 3:
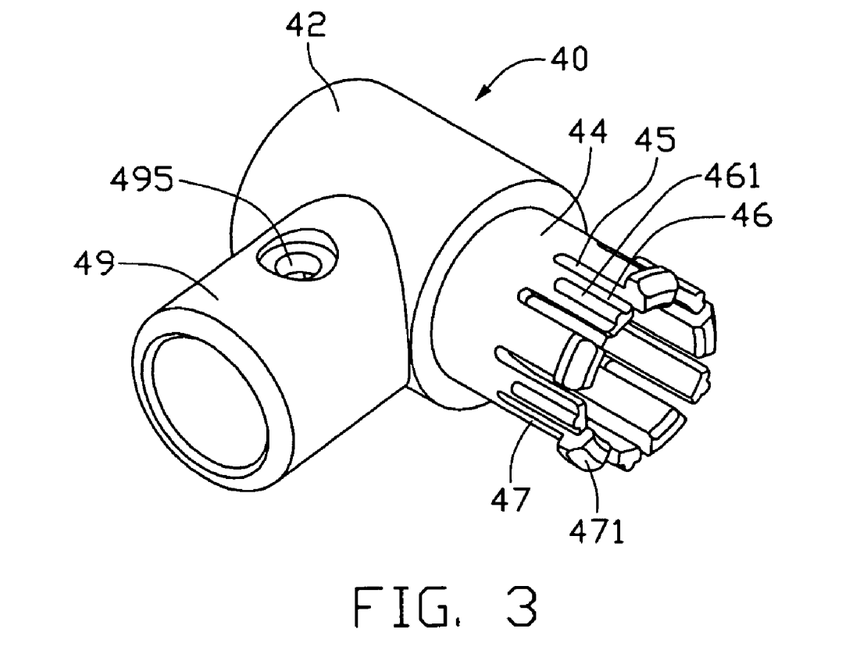
FIGS. 3 and 4 are isometric views of the connecting member and the pivoting member of the stand of FIG. 1 respectively.

Referring to FIG. 3, each connecting member 40 includes a sleeve 42, a collar 44 extending from an end of the sleeve 42, and a tube 49 extending from an outer circumferential surface of the sleeve 42. An axis of the sleeve 42 is generally perpendicular to that of the tube 49 and is coaxial to that of the collar 44. Each tube 49 is for receiving the free end of the corresponding lever 14 of the base frame 10. Each collar 44 includes a plurality of latching portions 47, and a plurality of locating portions 46 formed on a free end thereof. The latching portions 47 and the locating portions 46 are spaced from each other. A plurality of notches 45 is formed in the free end of the collar 44, and each notch 45 is located between each latching portion 47 and locating portion 46. A protrusion 461 is formed on an outer side of each locating portion 46. A catch 471 outwardly protrudes from a free end of the latching portion 47. A hole 495 is defined in each tube 49 corresponding to the threaded hole 143. The tubes 49 can engage with the free ends of the levers 14 respectively. The collars 44 are for receiving two ends of the shaft 16 respectively.

Figure 4:
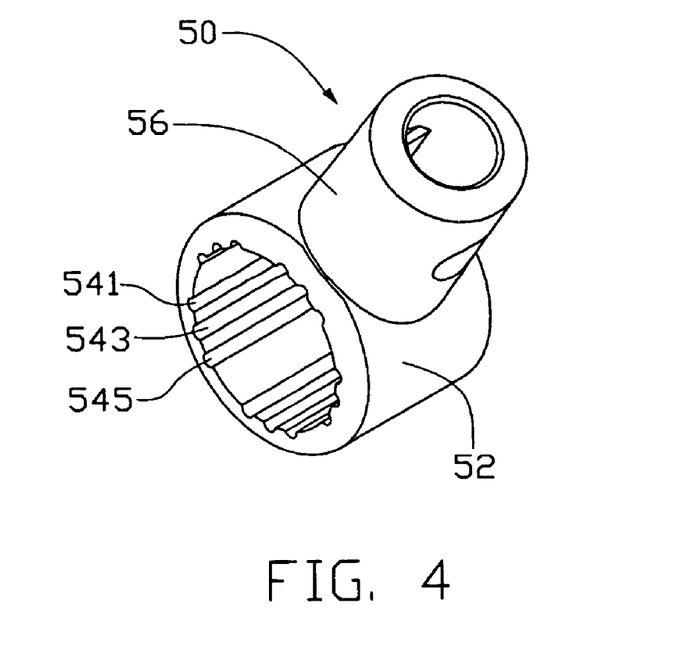

Referring to FIG. 4, each pivoting member 50 includes a sleeve 52, and a tube 56 extending from an outer circumferential surface of the sleeve 52. An axis of the sleeve 52 intersects with that of the tube 56. A plurality of first latching slots 541, second latching slots 543, and third latching slots 545 are spaced alternately arranged in an inner side of the sleeve 52, corresponding to the protrusions 461. The sleeve 52 can pivotally receive the collar 44 of the corresponding connecting member 40 therein. The tube 56 is for receiving a free end of the pole 22 of the corresponding clamping arm 20.

Figure 5:
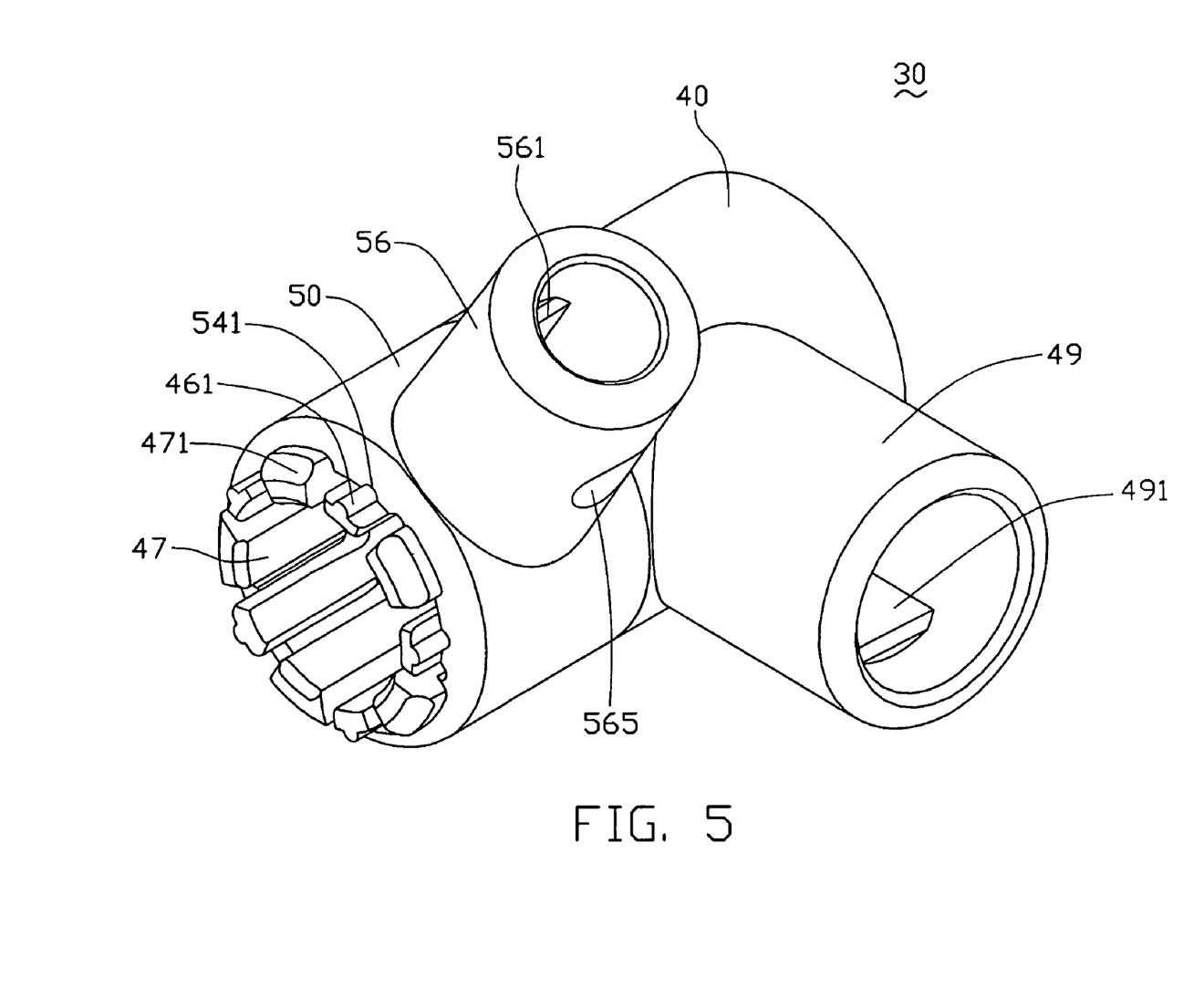
FIGS. 5, 6, and 7 are assembled views of the connecting member and the pivoting member of FIGS. 3 and 4, in three different working states.
Figure 6:
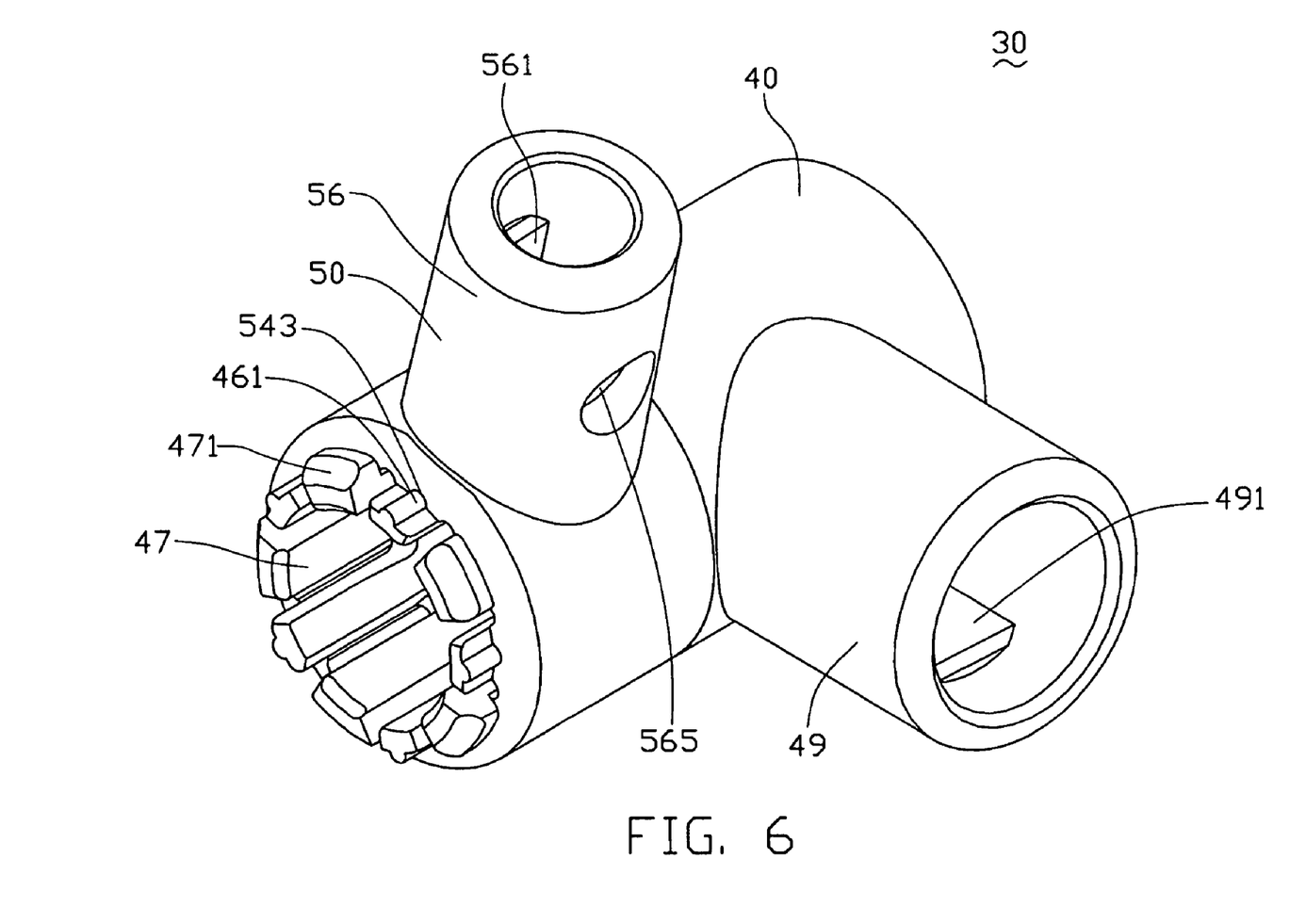
Figure 7:
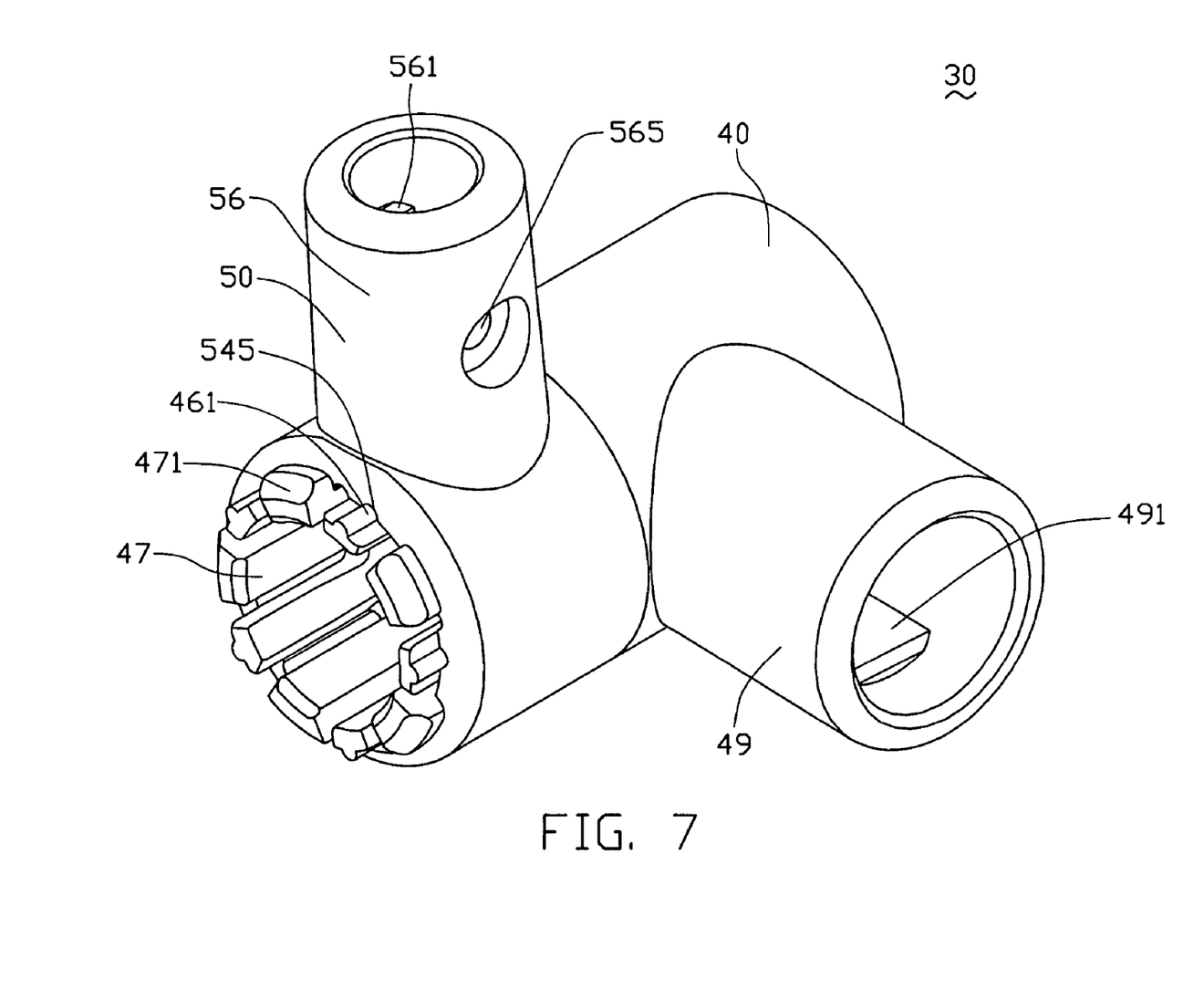

Referring to FIGS. 5, 6, and 7, each connecting member 40 is connected with the corresponding pivoting member 50. The collar 44 elastic shrinks and passes through the sleeve 52. Then the catch 471 of the collar 44 latches the sleeve 52 by elastic restoration of the collar 44. The protrusion 461 of the locating portion 46 is latched in one of the first latching slot 541, the second latching slot 543, and the third latching slot 545. FIGS. 5, 6, and 7 illustrate these three states respectively. Additionally, blocks 491 and 561 are arranged in the tube 49 of the connecting member 40 and the tube 56 of the pivoting member 50, corresponding to the cutouts 141 and 221 respectively. The blocks 491 and 561 can prevent the levers 14 and the poles 22 from rotating around in the tubes 49 and 56 respectively.

Referring to FIG. 8, in assembly, each connecting member 40 is connected with the corresponding pivoting member 50. Two ends of the shaft 16 are inserted into the collars 44 of the connecting members 40. Free ends of the poles 22 of the clamping arms 20 are securely retained in the tubes 56 of the pivoting members 50 by screws 200 being screwed into the holes 565 of the tubes 56 and the threaded holes 223 of the poles 22. Free ends of the levers 14 of the base frame 10 are securely retained in the corresponding tubes 49 of the connecting members 40, by screws 100 being screwed into the holes 495 of the tubes 49 and the threaded holes 143 of the levers 14.

In use, the retaining pads 24 sandwich two sides of the computer chassis 400 therebetween. The beam 12 of the base frame 10 and the shaft 16 support the bottom of the computer chassis 400. The clamping arms 20 can be rotated to a fit position to retain a computer chassis with a different size. The clamping arms 20 can also be rotated to overlap the base frame 10 when the stand is not used. Therefore, the stand occupies an even less space, which is convenient in transport or in carry.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment.

What is claimed is:

1. A stand for retaining a chassis, the stand comprising:
   a base frame for supporting the chassis thereon, the base frame comprising a pair of levers and a beam connecting one end of each of the levers;
   a pair of clamping arms for sandwiching the chassis therebetween;
   a pair of pivoting members, each of the pivoting members comprising a linking portion and a pivoting portion, the linking portions connected to the clamping arms respectively, the pivoting portions pivotally connected to two ends of the base frame respectively, each pivoting portion comprising a device by which the clamping arms capable of being turned to a position and kept in the position; and
   a pair of connecting members, each of the connecting members comprising a first connecting portion and a second connecting portion, the first connecting portion connected to the other end of the corresponding lever, and the second connecting portion connected to the pivoting portion of the corresponding pivoting member, wherein the second connecting portion of each of the connecting members comprises a plurality of elastic locating portions extending out from a free end thereof in a direction parallel with an axis of the second connecting portion, a protrusion is formed on an outer side of each of the locating portions, the pivoting portion of each of the pivoting members comprises a plurality of latching slots, the locating portions of each of the connecting members are inserted into the corresponding pivoting portion, and the protrusions engage in the corresponding latching slots to selectively locate the clamping arms in different locations.

2. The stand as claimed in claim 1, wherein the number of the latching slots is at least twice as that of the protrusions, each of the connecting members is rotatable in the corresponding pivoting portion, and the protrusions of the connecting member are respectively engage in different latching slots of the corresponding pivoting portion.

3. The stand as claimed in claim 1, wherein the second connecting portion of each of the connecting members comprises a plurality of elastic latching portions extending out from a free end thereof in the direction parallel with the axis of the second connecting portion, a catch outwardly protrudes from a free end of each of the latching portions, the latching portions of each of the connecting members extend through the corresponding pivoting portion, the catches are exposed out of the pivoting portion and latch an outer edge of the pivoting portion of the corresponding pivoting member.

4. The stand as claimed in claim 1, wherein a cutout and a threaded hole are defined in the end of each of the levers, a block is arranged in the first connecting portion of each of the connecting members, and the block is inserted into the corresponding cutout and prevents the corresponding lever rotating in the first connecting portion.

5. The stand as claimed in claim 1, wherein the stand further comprises a shaft for supporting the chassis, and each end of the shaft are received in the second connecting portion of the corresponding connecting member.

6. The stand as claimed in claim 1, wherein each of the clamping arms comprises a pole and a retaining pad arranged at one end of the pole, the retaining pads are adapted for sandwiching the chassis therebetween, and the other end of the pole is attached to the linking portion of the corresponding pivoting member.

7. The stand as claimed in claim 6, wherein a cutout and a threaded hole are defined in the other end of the pole, a block is arranged in the linking portion of each of the pivoting members, and the block is inserted into the corresponding cutout and prevents the corresponding clamping arm rotating in the linking portion.

8. The stand as claimed in claim 7, wherein a plurality of bushes is separately fixed around the base frame.

9. A stand for retaining a chassis, the stand comprising:
   a base frame for supporting the chassis, the base frame comprising a pair of levers and a shaft connected to the levers;
   a pair of clamping arms for sandwiching the chassis therebetween;
   a pair of connecting members, each of the connecting members comprising a first connecting portion and a second connecting portion, the first connecting portion connected to a corresponding lever, the second connecting portion connected to the shaft;
   a pair of pivoting members, each of the pivoting members comprising a linking portion and a pivoting portion, the linking portion connected to a corresponding clamping arm, the pivoting portion pivotally connected to the second portion of a corresponding connecting member, each pivoting portion comprising a device by which the clamping arms capable of being turned to a position and kept in the position.

10. The stand as claimed in claim 9, wherein the second connecting portion of each of the connecting members comprises a plurality of elastic locating portions extending out from a free end thereof in a direction parallel with an axis of the second connecting portion, a protrusion is formed on an outer side of each of the locating portions, the pivoting portion of each of the pivoting members comprises a plurality of groups of latching slots corresponding to the protrusions, the number of the groups of latching slots is equal to that of the protrusions, each group of the latching slots comprises at least two latching slots, the locating portions of each of the connecting members are inserted into the corresponding pivoting portion, and each protrusion engages in either one of the latching slots of the corresponding group of latching slots to selectively locate the clamping arms in different locations.

11. The stand as claimed in claim 9, wherein the second connecting portion of each of the connecting members comprises a plurality of elastic latching portions extending out from an end thereof in the direction parallel with the axis of the second connecting portion, a catch outwardly protrudes from an end of each of the latching portions, the catches of each of the connecting members extend through the corresponding pivoting portion from an end thereof and then engage with the opposite end of the pivoting portion.

12. The stand as claimed in claim 9, wherein a cutout and a threaded hole are defined in an end of each of the levers, a block is arranged in the first connecting portion of each of the connecting members, and the block is inserted into the corresponding cutout and prevents the corresponding lever rotating in the first connecting portion.

13. The stand as claimed in claim 9, wherein a plurality of bushes is separately fixed around the base frame and the shaft.

14. The stand as claimed in claim 9, wherein each of the clamping arms comprises a pole and a retaining pad arranged at one end of the pole, the retaining pads are adapted for sandwiching the chassis therebetween, and a free end of the pole is attached to the linking portion of the corresponding pivoting member.

15. The stand as claimed in claim 14, wherein a cutout and a threaded hole are defined in the other end of the pole, a block is arranged in the linking portion of each of the pivoting members, and the block is inserted into the corresponding cutout and prevents the corresponding clamping arm rotating in the linking portion.

16. An assembly comprising:
an electronic device of said assembly; and
a stand installable next to said electronic device, and comprising a base frame adapted to load said electronic device thereon via a first side of said electronic device so as to supportively maintain said electronic device along a preset orientation thereof, at least one arm mechanically connectable to said base frame and extending along a second side of said electronic device other than said first side thereof, said at least one arm forming a pad at an extending end thereof so as to engage with said second side of said electronic device and apply a force thereon exclusively via said pad, and disabling movement of said electronic device toward said at least one arm when said pad engages with said second side of said electronic device under a condition of restorably moving said at least one arm along a direction intersecting with said second side of said electronic device, said pad being movable together with said at least one arm relative to said base frame along said second side of said electronic device to maintain engagement with said second side so as to vary said force between said pad and said second side of said electronic device based on a location of said pad relative to said second side in order for disabling said movement of said electronic device toward said at least one arm;
wherein said restorably moving of said at least one arm along said direction intersecting with said second side of said electronic device is performed by a pivoting member installable to an end of said at least one arm and a connecting member installable to said base frame, said pivoting member is movable to engage with said connecting member along said direction.

17. The assembly as claimed in claim 16, wherein said connecting member comprises a plurality of elastic locating portions extending out from a free end thereof, a protrusion is formed on an outer side of each of the locating portions, said pivoting member comprises a plurality of latching slots configured for engaging with the corresponding protrusions of the connecting member, used to position said at least one arm when said pad moves to said location thereof relative to said second side of said electronic device.

18. The assembly as claimed in claim 16, wherein said pad is rubber suction portion capable of being stuck to said second side of the electronic device to position said arm when said pad moves to said location thereof relative to the corresponding second side of said electronic device.

* * * * *